United States Patent [19]
Friis et al.

[11] Patent Number: 5,890,841
[45] Date of Patent: Apr. 6, 1999

[54] SUBSEA CABLE INSTALLATION

[75] Inventors: Brigt Løkke Friis, Oslo; John Øivind Nørholmen, Lorenskøg; Lars Aksel Solberg, Oslo, all of Norway

[73] Assignee: Alcatel, France

[21] Appl. No.: 844,382

[22] Filed: Apr. 18, 1997

[51] Int. Cl.⁶ ..................................................... F16L 1/04
[52] U.S. Cl. ..................... 405/170; 294/66.1; 294/67.5; 405/158; 405/173
[58] Field of Search ..................................... 405/173, 191, 405/188; 166/338, 339, 343, 347; 294/66.1, 67.5

[56] References Cited

U.S. PATENT DOCUMENTS

| | | | |
|---|---|---|---|
| 3,578,233 | 5/1971 | Meister | 405/170 X |
| 3,835,655 | 9/1974 | Oliver | 405/170 |
| 3,842,612 | 10/1974 | Arnold | 405/173 |
| 4,076,130 | 2/1978 | Sumner | 405/170 |
| 4,080,799 | 3/1978 | Nanny | 405/170 |
| 4,444,528 | 4/1984 | Scodino et al. | 405/173 |

FOREIGN PATENT DOCUMENTS 2047177  11/1980  United Kingdom ................... 405/173

*Primary Examiner*—Dennis L. Taylor
*Attorney, Agent, or Firm*—Ware, Fressola, Van der Sluys & Adolphson LLP

[57] ABSTRACT

The present invention relates to a method and means for transferring a construction—consisting of an elongated article (2,21) provided with at least one termination (3,20, 40)—between a vertical position and a horizontal position and vice versa. Handling means (10,22,31,44) are attached to the termination housing (3,20,40) so as to balance and handle the termination substantially at a combined center of gravity (14,26,34,45) and thereby prevent undue bending of the elongated article (2,21) during the transfer.

13 Claims, 4 Drawing Sheets

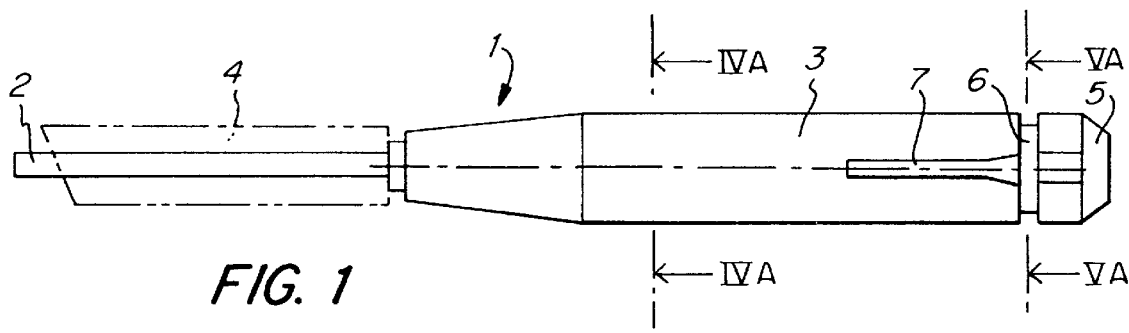
FIG. 1
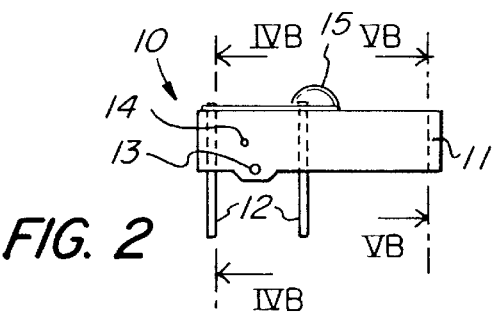
FIG. 2
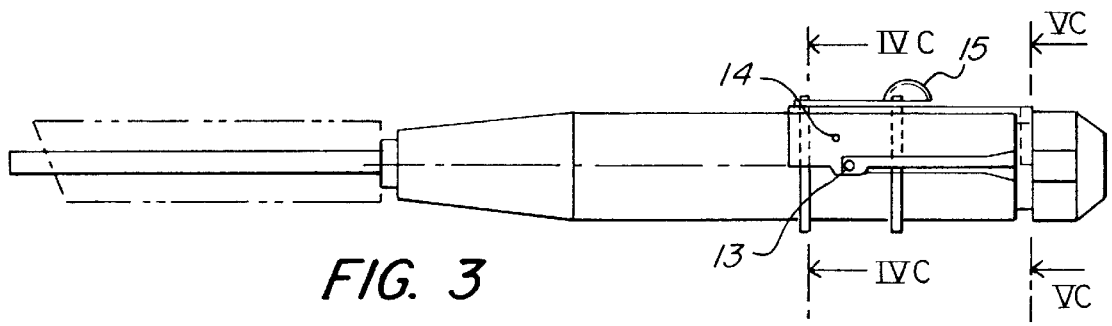
FIG. 3
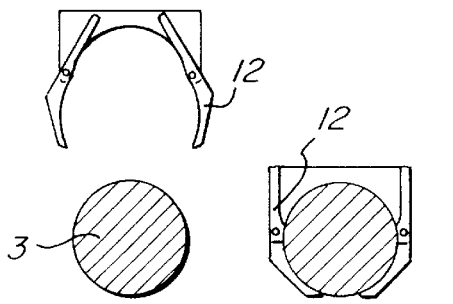
FIG. 4B
FIG. 4A   FIG. 4C
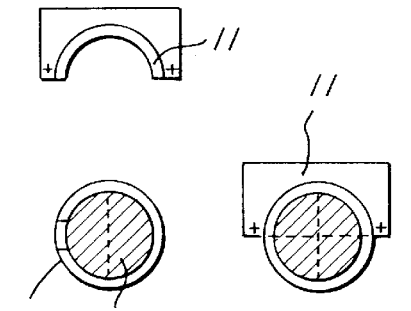
FIG. 5B
FIG. 5A   FIG. 5C

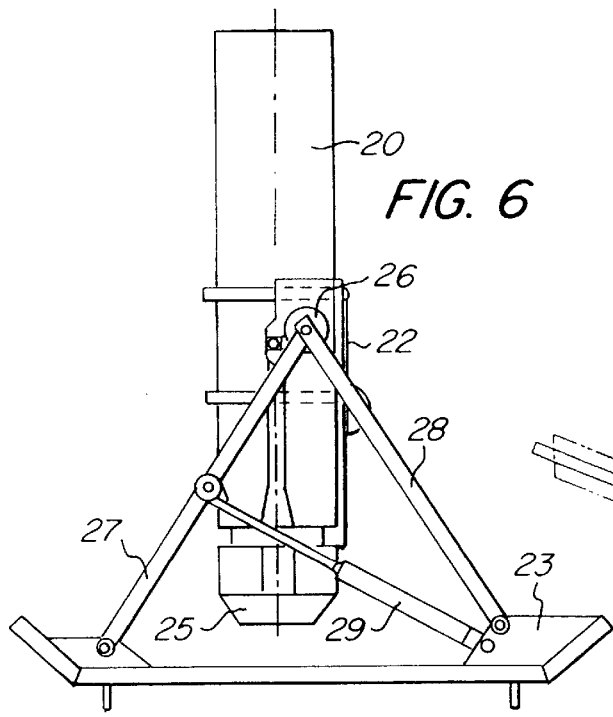
FIG. 6
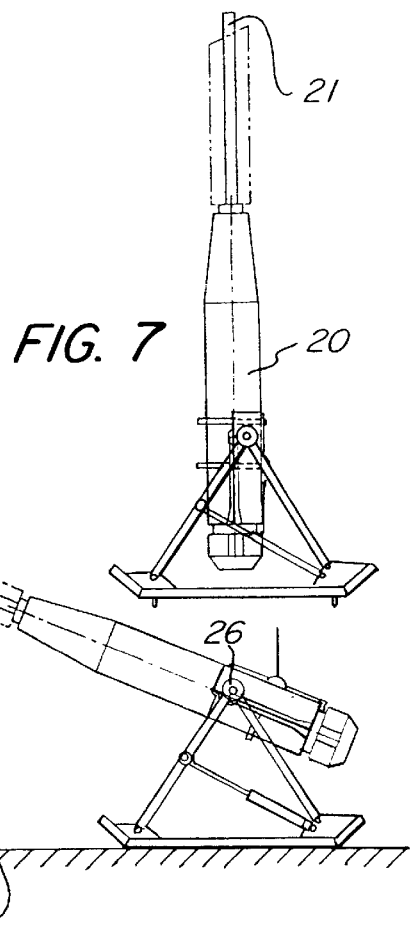
FIG. 7
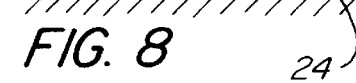
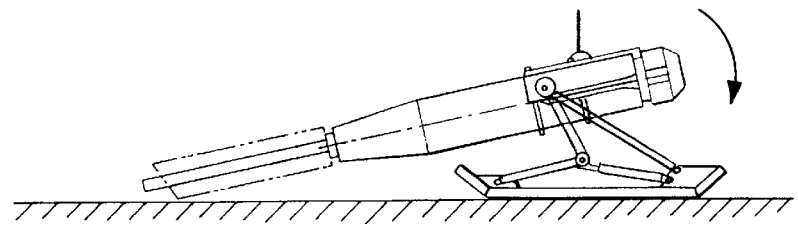
FIG. 8
FIG. 9
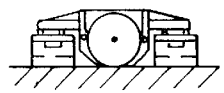
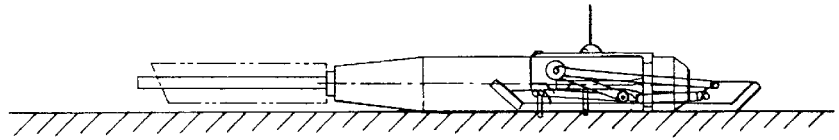
FIG. 11
FIG. 13
FIG. 10
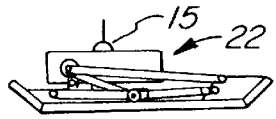
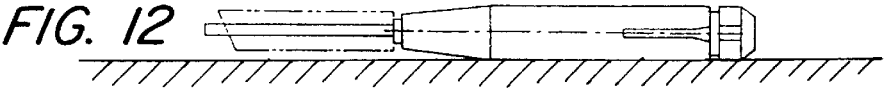
FIG. 12

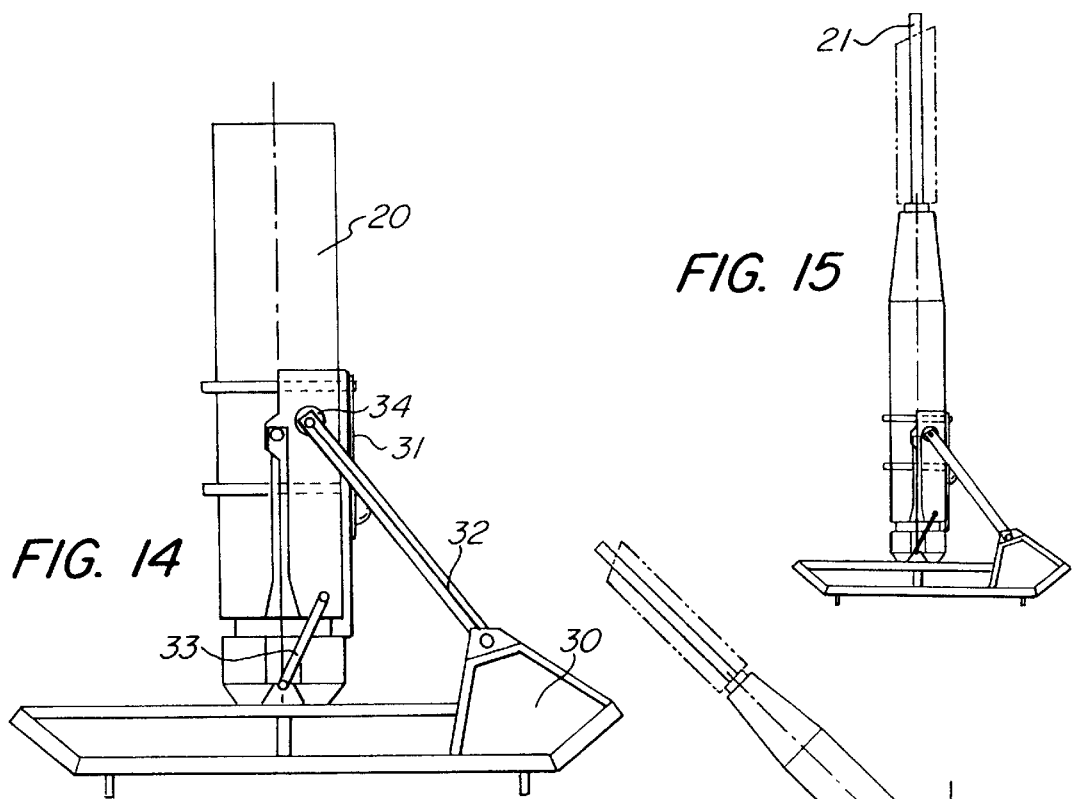
FIG. 14
FIG. 15
FIG. 16
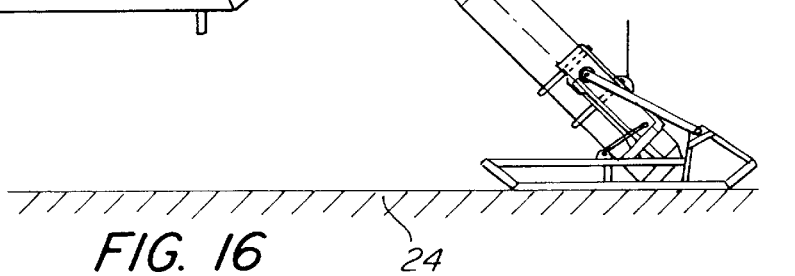
FIG. 17
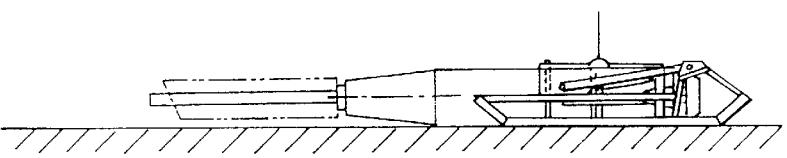
FIG. 19
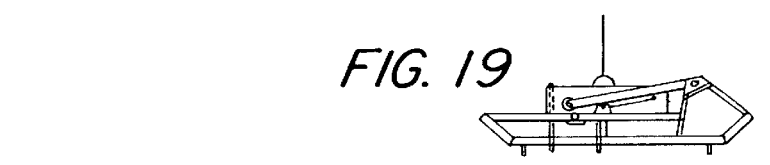
FIG. 18

… ….

SUBSEA CABLE INSTALLATION

BACKGROUND OF THE INVENTION

The present invention relates to a method and means for installation of elongated articles and in particular to transferring a construction from a horizontal to a vertical position and vice versa. More specifically the invention relates to handling of heavy bodies, such as a housing which constitutes a termination of an elongated article. The elongated article may be a cable, an umbilical containing cables and/or pipes and similar articles which are to be lowered and lifted to and from a sea bed.

When the housing interconnected with and terminating the elongated article is very heavy and rigid as compared to the article itself, the area of interconnection is usually protected with a bending restrictor or a bending strain restrictor. An utmost care must, however, be taken to prevent damage to the elongated article when the construction is to be lifted from a horizontal rest position to a vertical position and vice versa. Similar problems arise when a construction is to be lowered in the sea from a vertical position to a horizontal position on the sea bed and vice versa.

SUMMARY OF THE INVENTION

The object of the invention is to provide a method and means for handling constructions mentioned above without damaging the components of the construction, in particular the elongated article.

With the invention we have obtained a reliable method and means for handling termination housings of elongated articles. When rotating the construction about its combined center of gravity the bending moment outside the termination housing is reduced to a minimum so that bending strain relievers can he reduced correspondingly without causing damage to the elongated article.

Above mentioned and other features and objects of the present invention will clearly appear from the following detailed description of embodiments of the invention taken in conjunction with the drawings.

BRIEF DESCRIPTION OF THE DRAWINGS

FIG. 1 illustrates a termination housing and part of an elongated article,

FIG. 2 illustrates housing handling means,

FIG. 3 shows handling means attached to the housing,

FIGS. 4(A,B,C) and 5(A,B,C) illustrate cross-sections through FIGS. 1, 2 and 3,

FIGS. 6 to 13 illustrate several stages in lowering a first end of an elongated article, FIGS. 14 to 19 illustrate an alternative way of lowering the first end.

In FIG. 1 is illustrated a terminated end 1 of an elongated article 2 including a termination housing 3. The transition from the elongated article 2 to the housing 3 is usually protected with a bending strain restrictor device 4. The weight of the termination housing 3 may, however, be more than 5,000 kg and there is a risk of damaging the elongated article 2 when handling the housing 3. The end portion 5 of the termination housing 3 is provided with a groove 6 for handling purposes. The housing 3 is also provided with a slot 7 on both sides for defining the rotation of the housing 3. The elongated article 2 may be a cable, an umbilical containing cables and/or pipes and similar articles. The end portion 5 is designed with a plug-in connector (not shown).

FIG. 2—and FIGS. 3 to 5—illustrate the principles of means 10 for handling the terminated end 1. There are provided guiding means 11 for engaging the groove 6 and defining the axial position of the handling means 10 relatively to the housing 3. An example of guiding means 11 is shown in FIG. 5B. There are also provided locking means 12, FIG. 4B, which are arranged to be locked around the housing 3. When the locking means 12 are released,—the guiding means 11 may move in or out of the groove 6. When the locking means 12 are locked,—tilted positions of the housing 3 are fully controlled by the handling means 10. The locking means 12 may also be designed to rotate the housing 3 about its longitudinal axis.

The locking means 12 may be controllable locking arms as indicated,—but in some cases releasable straps (not shown) would be sufficient. In FIGS. 2 and 3 are indicated one of two guide pins 13 which is arranged to be inserted into the slot 7 on both sides of the housing 3 thereby locking the rotation of the article 2 and housing 3 to the rotation of the handling means 10. The handling means 10 is also provided with pivot means 14 arranged slightly offset from a combined center of gravity of the housing 3 and the means 10. The means 10 is also provided with a handling eye 15.

Whereas FIG. 1 shows a termination housing 3 of an elongated article 2 and FIG. 2 shows one embodiment of handling means 10,—FIG. 3 illustrates how the means 10 can be arranged on the housing 3. FIGS. 4(A,B,C) and 5(A,B,C) schematically and respectively show cross-sections IV—IV (A,B,C) and V—V (A,B,C) taken through FIGS. 1, 2 and 3.

In FIGS. 6 to 23 are illustrated remedies and procedures for lowering an elongated article having a termination housing in each end,—to a sea bed. In FIGS. 6 to 13 and 14 to 19 are illustrated remedies for lowering a first end 20 to the sea bed, whereas FIGS. 20 to 24 illustrate remedies for lowering the second end 40.

FIG. 6 illustrates a housing 20 which is hanging vertically in the sea by its elongated article 21 (FIG. 7) from a floating surface vessel (not shown). Handling means 22 which are locked to the housing 20 as explained above, are provided with a buffer or sled like structure 23 on each side of the housing. FIGS. 7 to 10 illustrate how the housing can be smoothly lowered to and deposited on the sea bed 24. The purpose of the structure 23 is to prevent the end portion 25 of the housing from penetrating into the sea bed 24 upon touchdown. The structure 23 is designed and balanced so that it remains in a horizontal position during the lowering procedures.

Figure 20:
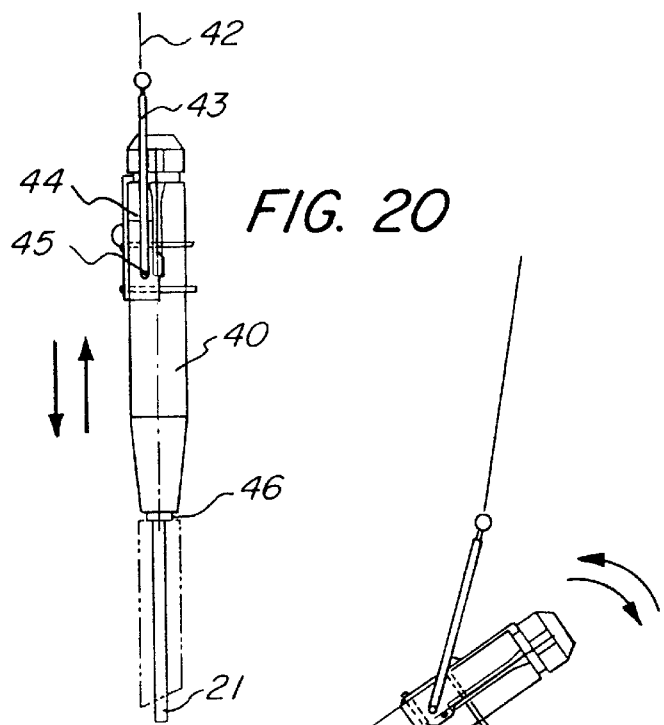
FIGS. 20 to 24 illustrate several stages in lowering a second end of an elongated article.

When structure 23 reaches the sea bed 24 and the elongated article 21 is still paid off from the surface vessel, the housing 20 will start rotating about a combined center of gravity pivot 26. The critical area is the interconnection between the article 21 and the housing 20 where the bending diameter should be determined by the bending strain restrictor. Actually the pivot 26 is placed slightly offset from the real center of gravity in order to make sure that the housing 20 tilts in the desired direction,—in this case to the left. When the housing 20—and elongated article 21—reaches a position shown in FIG. 9 means are arranged for collapsing one of the supporting legs 27 and 28 and depositing the housing 20 horizontally and safely on the sea bed 24 by means of a hydraulic device 29. The final lowering step is illustrated in FIGS. 10 and 11, the latter showing the deposited housing 20 seen from the end portion 25.

If required in order to prevent undue bending of the interconnection between the housing 20 and its elongated article 21, buoyancy devices (not shown) can be attached to the handling means 22. In the horizontal position (FIG. 12) of the housing 20, the handling means 22 (FIG. 13) will be released by a remote operated vehicle (ROV) and lifted to the surface vessel by attaching a wire to a handling eye 15. The first housing 20 and termination has now been placed in a target area and position on the sea bed 24 where it can easily be pulled into contact with a first subsea installation.

In FIGS. 14 to 19 are illustrated how an alternative buffer arrangement 30 can be used for depositing the first termination housing 20 on a sea bed. The butter 30 is pivotably attached to the handling means 31 by two guide arms 32 and 33 on each side of the housing. The arrangement is designed so that the buffer 30 remains in a horizontal position during the lowering of the article 21 and housing 20. The elongated article 21 and its termination housing 20 will be rotated from the vertical to the horizontal orientation about a combined slightly offset center of gravity pivot 34. FIGS. 15 or 19 are assumed to be self explanatory.

When the first end housing 20 and the elongated article 21—which can be several kilometers long—has been installed on the seabed 24,—the second end has to be lowered to the sea bed 24 close to a second sea bed installation (not shown).

Figure 21:
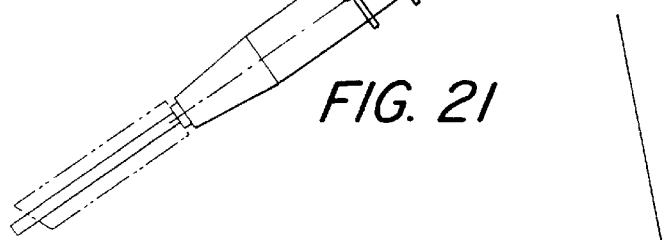
Figure 22:
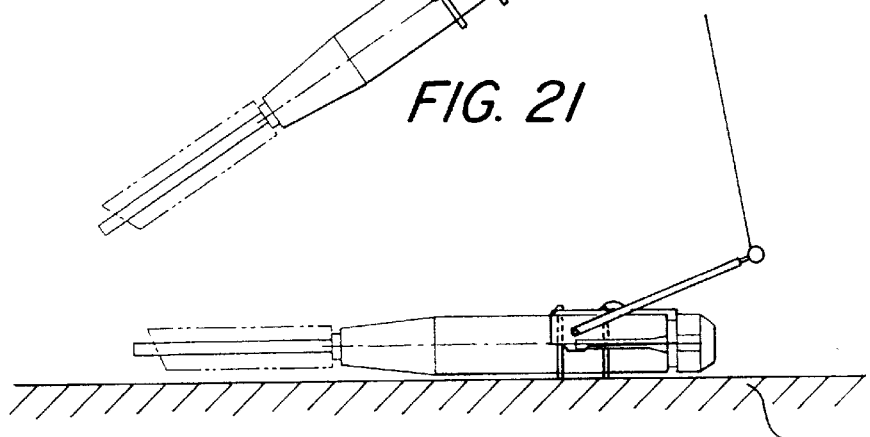

In FIGS. 20 to 22 are illustrated how the elongated article 21 with its second housing 40 can be lowered to the sea bed 41 by a wire 42 attached to a handle 43 on handling means 44. The handle 43 is attached to the handling means 44 at a combined center of gravity pivot 45 in order to prevent undue bending of the elongated article 21. A critical area is the interconnection 46 between the housing 40 and the article 21,—and as in the case of the lowering of the first housing 20 the optimum situation is that the overall bending diameter is as determined by the bending strain restrictor. The pivot 45 is slightly offset from the actual combined center of gravity in order to define the direction of rotation, in this case to the right.

Figure 24:
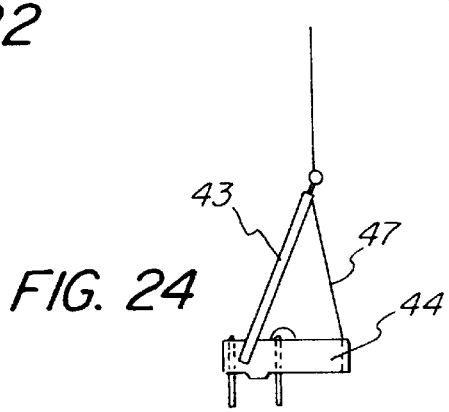
Figure 23:
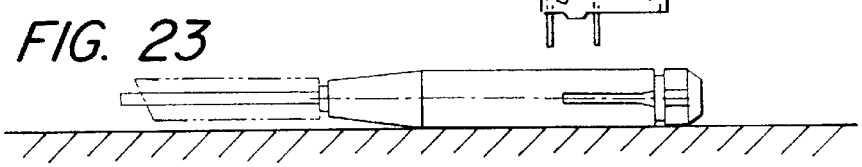

As in the case of installing and releasing the first housing 20, the second housing 40 is also released by having an ROV manipulate various control handles on the handling means 44. The handling means 44 may be lifted to the surface by the handle 43, as illustrated in FIG. 24. A wire 47 may be attached to the handling means 44 for maintaining it in a horizontal position.

If a housing (and elongated article) need to be released from the subsea installation and lifted to the surface for maintenance or of other reasons, the handling means 44 may be used for lifting any of the housings 20 and 40. The handling means is simply lowered into position with the guiding means 11 fitted into the groove 6—FIGS. 2, 3 and 5—whereupon the locking means 12—FIGS. 2, 3 and 4—are activated by an ROV and the lifting process can start. The housing will be rotated about its center of gravity and no damage will be done to the elongated article or to the termination housing. The arrows shown in FIGS. 20 and 21 indicate that the handle 43 can be used for both lowering arid lifting the housing 40 (and 20).

When using the handling means 10—or 22 or 31 or 44—for catching and lifting a termination off the ground or from a sea bed, the guide pin(s) 13 need not be activated. These guide pins are activated on the surface vessel before lowering the article with its terminations to the sea bed.

The above detailed description of embodiments of this invention must be taken as examples only and should not be considered as limitations on the scope of protection. If the termination housings for instance have other configurations this will require otherwise designed handling means. The principle of handling the housings substantially at the combined center of gravity is the main feature. When rotating the construction about its combined center of gravity the bending moment outside the termination housing is reduced to a minimum so that bending strain relievers can be reduced correspondingly without causing damage to the elongated article.

Remedies for passing the housings and handling means out of (and into) a surface vessel into (from) the sea are not described.

We claim:

1. A method for transferring an elongated article, provided with at least one termination housing, between a vertical position and a horizontal position, and vice versa, comprising the steps of:

(a) providing a flexible elongated article;

(b) providing at least one termination housing on the elongated article; and (c) attaching handling means having a pair of pivot points to the termination housing so as to balance and handle the termination housing substantially at a combined center of gravity of the termination housing and the handling means and to thereby prevent undue bending of the elongated article during rotation of the termination housing between the vertical position and the horizontal position.

2. Method for transferring the elongated article between a sea bed and a surface vessel, comprising the steps of:

(a) providing an elongated article;

(b) providing first and second termination housings on the elongated article;

(c) mounting first handling means to the first termination housing by employing guiding means and locking means as well as guide pins to secure the first termination housing in a predetermined lengthwise and rotational position relatively to the first handling means, the first handling means including buffer means pivotably connected substantially at a combined center of gravity of the first termination housing and the first handling means;

(d) lowering the first handling means and the first termination housing with the elongated article attached thereto from the vessel to the sea bed and depositing the first termination housing in a first desired target area and position on the sea bed;

(e) releasing the first handling means from the first termination housing and lifting the handling means to the vessel;

(f) installing at least a portion of the elongated article along a predetermined path on the sea bed;

(g) mounting second handling means to the second termination housing by employing guiding means, locking means and guide pins to secure the second termination housing in a predetermined lengthwise and rotational position relatively to the second handling means, the second handling means including handle means pivotably connected substantially at a combined center of gravity of the second termination housing and the second handling means;

(h) lowering the second handling means and the second termination housing with the elongated article attached thereto from the vessel to the sea bed and depositing the second termination housing in a second desired target area and position on the sea bed; and (i) releasing the second handling means from the second termination housing and lifting the second handling means to the vessel.

3. Method according to claim 2, further comprising the steps of:

(a) lowering a selected one of the first and second handling means down to a selected one of the first and second termination housings;

(b) locking the selected one of the first and second handling means to the selected one of the first and second termination housings; and (c) lifting the selected one of the first and second termination housings with the elongated article attached thereto to the vessel.

4. Means for transferring a flexible elongated article between a vertical orientation and a horizontal orientation without undue bending thereof, comprising:

a termination housing adapted for attachment to said elongated article adjacent one end thereof, and means engageable with the termination housing for handling and balancing the termination housing substantially at a combined center of gravity of the handling and balancing means and the termination housing, thereby preventing said undue bending of the elongated article during transfer between the vertical orientation and the horizontal orientation.

5. Means according to claim 4, wherein the handling and balancing means includes guiding means and locking means for releasably attaching the handling and balancing means to the termination housing.

6. Means according to claim 4, wherein the handling and balancing means includes guide pins for defining a rotational orientation of the termination housing during a horizontal deposition procedure.

7. Means according to claim 4, further comprising buffer means for preventing the termination housing from penetrating a horizontal surface.

8. Means according to claim 7, wherein the buffer means is attached to the handling and balancing means at a position slightly offset from the combined center of gravity of the handling and balancing means and the termination housing in order to define a lowering procedure.

9. Means according to claim 7, wherein the buffer means is attached to the handling and balancing means at two positions which together constitute a slightly offset center of gravity.

10. Means according to claim 4, wherein the handling and balancing means includes handle means for lowering and lifting the termination housing and the elongated article attached thereto to and from a horizontal surface.

11. Means according to claim 10, wherein the handle means is attached to the handling and balancing means at a position slightly offset from the combined center of gravity in order to define a lowering procedure.

12. Means according to claim 4, wherein the handling and balancing means includes means for lowering and lifting the handling and balancing means in a horizontal orientation separate from the termination housing and the elongated article attached thereto.

13. Means according to claim 4, wherein the handling and balancing means is arranged for lowering and lifting the termination housing and the elongated article attached thereto between a sea bed and a surface vessel.

* * * * *